(12) United States Patent
Son et al.

(10) Patent No.: US 12,259,149 B2
(45) Date of Patent: Mar. 25, 2025

(54) AIR CONDITIONER AND METHOD FOR CONTROLLING SAME

(71) Applicant: SAMSUNG ELECTRONICS CO., LTD., Suwon-Si (KR)

(72) Inventors: Kilsoo Son, Suwon-si (KR); Sukho Kang, Suwon-si (KR); Taewoo Kim, Suwon-si (KR); Seungjun Park, Suwon-si (KR); Hyeongjoon Seo, Suwon-si (KR); Wonfa Song, Suwon-si (KR); Younguk Yun, Suwon-si (KR); Byoungguk Lim, Suwon-si (KR); Youngju Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 17/848,591

(22) Filed: Jun. 24, 2022

(65) Prior Publication Data

US 2022/0316732 A1 Oct. 6, 2022

Related U.S. Application Data

(63) Continuation of application No. PCT/KR2020/016196, filed on Nov. 17, 2020.

(30) Foreign Application Priority Data

Jan. 2, 2020 (KR) .................. 10-2020-0000387

(51) Int. Cl.
*F24F 11/43* (2018.01)
*F24F 11/63* (2018.01)
(Continued)

(52) U.S. Cl.
CPC .............. *F24F 11/43* (2018.01); *F24F 11/63* (2018.01); *F24F 11/81* (2018.01); *F24F 11/83* (2018.01); *F24F 2110/20* (2018.01)

(58) Field of Classification Search
CPC ............ F24F 11/43; F24F 11/63; F24F 11/81; F24F 11/83; F24F 2110/20; F24F 1/0007;
(Continued)

(56) References Cited

U.S. PATENT DOCUMENTS 10,837,872 B2 * 11/2020 Son .......................... F24F 11/38
10,852,031 B2 12/2020 Kim et al.
(Continued)

FOREIGN PATENT DOCUMENTS

CN 106196476 A 12/2016
CN 106556106 A 4/2017
(Continued)

OTHER PUBLICATIONS

Office Action dated Oct. 5, 2023, in European Patent Application No. 20908846.7.
(Continued)

*Primary Examiner* — Nelson J Nieves
*Assistant Examiner* — Matthew John Moscola
(74) *Attorney, Agent, or Firm* — STAAS & HALSEY LLP

(57) ABSTRACT

An air conditioner and a method for controlling same are disclosed. An air conditioner according to the disclosure comprises: an indoor unit including an indoor heat exchanger and an indoor fan; an outdoor unit including a compressor; at least one sensor; at least one memory storing instructions; and at least one processor to execute the instructions to identify a freezing process to form ice-capsules on a surface of the indoor heat exchange according to a first relative humidity sensed through the at least one sensor, control the indoor fan and the compressor to operate in the identified freezing process so that the ice-capsules are formed, identify a thawing process to thaw the formed ice-capsules according to a second relative humidity sensed
(Continued)

through the at least one sensor while the indoor fan and the compressor are operating in the identified freezing process, and control the indoor fan to operate in the identified thawing process.

25 Claims, 9 Drawing Sheets

(51) Int. Cl.
  *F24F 11/81* (2018.01)
  *F24F 11/83* (2018.01)
  *F24F 110/20* (2018.01)
(58) Field of Classification Search
  CPC ............ F24F 11/30; F24F 11/62; F24F 11/77; F24F 11/65; Y02B 30/70
  See application file for complete search history.

(56) References Cited

U.S. PATENT DOCUMENTS

| | | | |
|---|---|---|---|
| 10,969,134 B2 | 4/2021 | Zhang et al. | |
| 11,549,715 B1* | 1/2023 | Thrift ..................... | F24F 11/64 |
| 2007/0246553 A1* | 10/2007 | Morrow .................. | F24F 11/30 |
| | | | 236/94 |
| 2013/0154839 A1* | 6/2013 | Barton .................. | F24F 12/001 |
| | | | 340/584 |
| 2018/0259208 A1 | 9/2018 | Wang et al. | |
| 2018/0259216 A1 | 9/2018 | Zhang et al. | |
| 2019/0017725 A1 | 1/2019 | Kim et al. | |
| 2021/0341169 A1 | 11/2021 | Oh et al. | |

FOREIGN PATENT DOCUMENTS

| | | |
|---|---|---|
| CN | 106642540 A | 5/2017 |
| CN | 106679067 A | 5/2017 |
| CN | 106765873 A | 5/2017 |
| CN | 107166670 A | 9/2017 |
| CN | 109140666 A | 1/2019 |
| CN | 202217043500 | 1/2019 |
| CN | 105605742 B | 2/2019 |
| CN | 109373504 A | 2/2019 |
| CN | 109790994 A | 5/2019 |
| EP | 3 346 200 A1 | 7/2018 |
| EP | 3 611 446 A1 | 2/2020 |
| EP | 3 617 609 A1 | 3/2020 |
| EP | 3 862 643 A1 | 8/2021 |
| JP | 2009-243796 A | 10/2009 |
| JP | 2010-14288 A | 1/2010 |
| JP | 6360593 B1 | 6/2018 |
| JP | 2018-189360 A | 11/2018 |
| JP | 2018189356 A * | 11/2018 ............ F24F 1/0003 |
| JP | 2018-537640 A | 12/2018 |
| JP | 2019-39669 A | 3/2019 |
| JP | 6486586 B1 | 3/2019 |
| JP | 6498374 | 4/2019 |
| JP | 6534783 B1 | 6/2019 |
| JP | 2020-38053 | 3/2020 |
| JP | 2020-70892 | 5/2020 |
| KR | 10-2020-0088609 A | 7/2020 |
| WO | WO 2018/198390 A1 | 11/2018 |
| WO | WO 2019/043765 A1 | 3/2019 |
| WO | WO 2019/220488 A1 | 11/2019 |
| WO | WO 2020/070891 A1 | 4/2020 |
| WO | WO-2020148846 A1 * | 7/2020 |

OTHER PUBLICATIONS

International Search Report issued in PCT/KR2020/016196 dated Feb. 24, 2021.
Written Opinion issued in PCT/KR2020/016196 dated Feb. 24, 2021.
Korean Office Action dated Sep. 7, 2021, in Korean patent application No. 10-2020-0000387
European Search Report dated Dec. 9, 2022, issued in European Patent Application No. 20908846.7.
Examination Report dated Jan. 11, 2023, issued in Indian Patent Application No. 202217043500.
Office Action dated Dec. 28, 2023, issued in Chinese Patent Application No. 202080091606.4.
Hearing Notice dated Feb. 28, 2024, issued in Indian Patent Application No. 202217043500.
Examination Report dated Feb. 5, 2025, in European Patent Application No. 20908846.7.

* cited by examiner

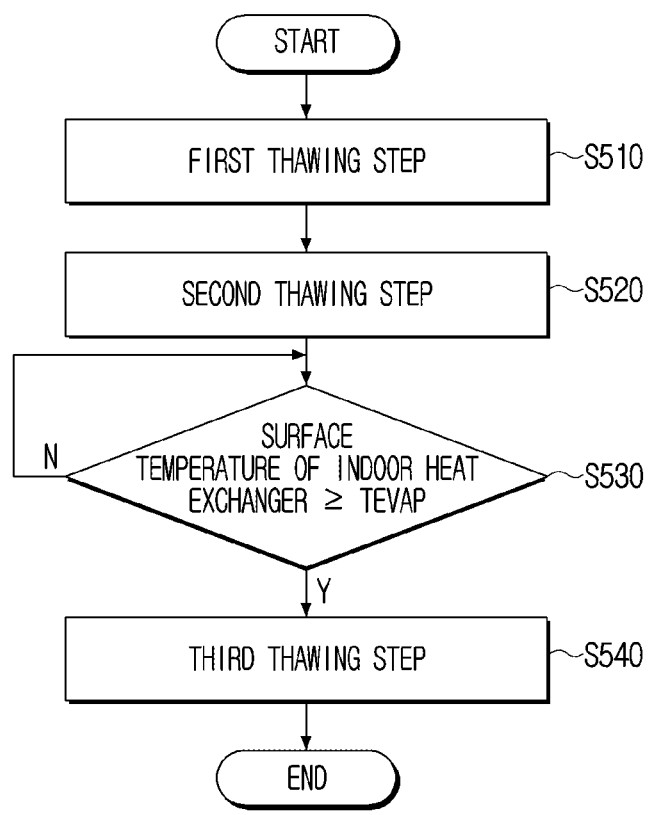

FIG. 6A

| | IMPLANTATION AMOUNT | DISCHARGE AMOUNT OF CONDENSATE WATER | FREEZING TIME | AMOUNT OF HAZE | THERMAL CONTRACTION EXPANSION SOUND |
|---|---|---|---|---|---|
| FREEZING RPM ↑ | INCREASE | INCREASE | INCREASE | INCREASE | DECREASE |
| FREEZING RPM ↓ | DECREASE | DECREASE | DECREASE | DECREASE | LOUDER |

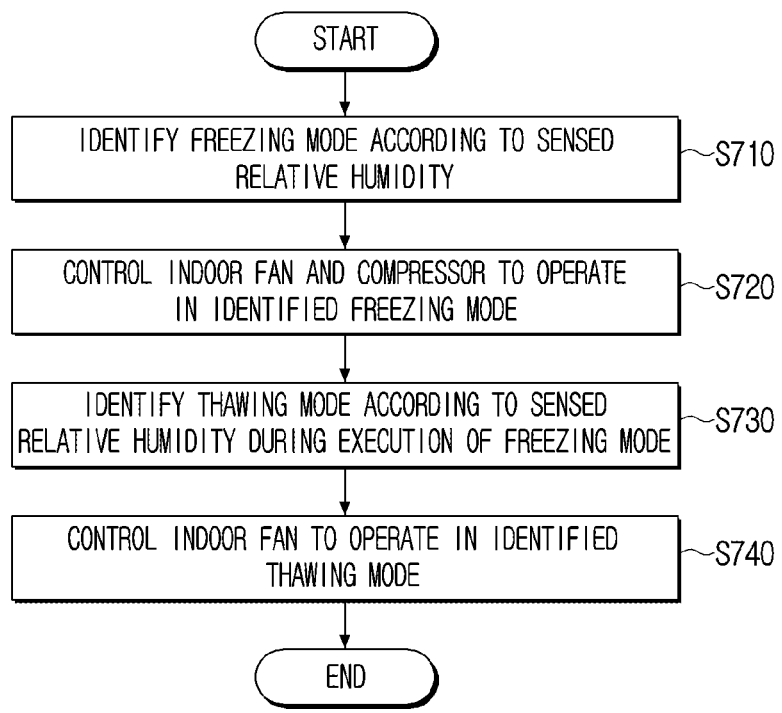

AIR CONDITIONER AND METHOD FOR CONTROLLING SAME

CROSS-REFERENCE TO RELATED APPLICATIONS

This application is a continuation of International application PCT/KR2020/016196, filed Nov. 17, 2020, which claims foreign priority to Korean application 10-2020-0000387, filed Jan. 2, 2020, the disclosures of which are incorporated herein by reference in their entireties.

BACKGROUND

1. Field

This disclosure relates to an air conditioner and a method for controlling the same, and more particularly, to an air conditioner capable of effectively cleaning a heat exchanger included in an indoor unit of the air conditioner and a method for controlling thereof.

2. Description of Related Art

There is a continuous growth of a technology related to an air conditioner. In particular, there is an increasing need for an air conditioner which may maintain indoor air at the most suitable temperature according to the use and purpose of the air conditioner, and which may adjust indoor air to a pleasant clean state at the same time.

In the case of a heat exchanger included in an indoor unit of an air conditioner, contaminants included in air sucked in by an indoor fan may be easily adsorbed on the surface of the heat exchanger, and odor may be caused by condensation water generated on the surface of the heat exchanger during cooling operation. Therefore, there is a need for technology for effectively cleaning a heat exchanger included in an indoor unit.

Although there is a technology for performing the blowing operation at the end of the cooling operation, it is difficult to expect the cleaning effect of discharging the contaminants adsorbed on the surface of the heat exchanger included in the indoor unit to the outside, as the blowing operation is mainly purposed to dry the surface of the heat exchanger included in the indoor unit and the inside of the indoor unit rather than cleaning the heat exchanger included in the indoor unit.

Accordingly, there is a need for a technology for effectively performing cleaning of a heat exchanger included in an indoor unit of an air conditioner, in addition to drying the heat exchanger included in the indoor unit of the air conditioner.

SUMMARY

According to an embodiment, an air conditioner includes an indoor unit comprising an indoor heat exchanger and an indoor fan; an outdoor unit comprising a compressor; at least one sensor; at least one memory storing instructions and configured to execute the instructions to identify a freezing process to form ice-capsules on a surface of the indoor heat exchanger according to a first relative humidity sensed through the at least one sensor, control the indoor fan and the compressor to operate in the identified freezing process so that the ice-capsules are formed, identify a thawing process to thaw the formed ice-capsules according to a second relative humidity sensed through the at least one sensor while the indoor fan and the compressor are operating in the identified freezing process, and control the indoor fan to operate in the identified thawing process.

The at least one processor may be configured to execute the instructions to, based on a user command for cleaning the indoor heat exchanger being received, control the indoor fan and the compressor so that the indoor fan rotates in a first freezing revolution per number (RPM) and the compressor operates in a pre-freezing operation in which the compressor rotates by a first compressor RPM, and identify the freezing process in accordance with the first relative humidity sensed through the at least one sensor while the compressor operating in the pre-freezing operation.

The at least one processor may be configured to execute the instructions to, based on the first relative humidity sensed through the at least one sensor while the compressor is operating in the pre-freezing operation being greater than a first threshold humidity, control the indoor fan and the compressor so as not to perform an operation in accordance with the freezing process and the thawing process.

The at least one processor may be configured to execute the instructions to, based on the first relative humidity sensed through the at least one sensor while the compressor is operating in the pre-freezing operation being less than or equal to the first threshold humidity and greater than or equal to a second threshold humidity less than the first threshold humidity, control the indoor fan and the compressor so as to operate in a first freezing operation in which the indoor fan rotates in a second freezing RPM less than the first freezing RPM and the compressor rotates with a second compressor RPM greater than the first compressor RPM.

The at least one processor may be configured to execute the instructions to, based on the first relative humidity sensed through the at least one sensor while the compressor is operating in the pre-freezing operation being less than or equal to the first threshold humidity and less than the second threshold humidity, control the indoor fan and the compressor so as to operate in the first freezing operation and then operate in a second freezing operation in which the indoor fan rotates with the second freezing RPM and the compressor does not rotate or rotates in the first compressor, and, after controlling the indoor fan and the compressor so as to operate in the first freezing operation, control the indoor fan and the compressor so as to operate in the first freezing operation.

The at least one processor may be configured to execute the instructions to, based on an evaporation temperature sensed through the at least one sensor being greater than or equal to a first target evaporation temperature while the indoor fan and the compressor are operating in the first freezing operation, terminate an operation according to the first freezing operation.

The at least one processor may be configured to execute the instructions to, based on a case of at least one of an indoor temperature sensed through the at least one sensor is less than a first threshold temperature while the compressor is operating in the pre-freezing operation, and an outdoor temperature sensed through the at least one sensor is less than a second threshold temperature while the compressor is operating in the pre-freezing operation, control the indoor fan and the compressor so as not to perform an operation according to the freezing process and the thawing process.

The thawing process may include a first thawing step in which the indoor fan rotates in a first thawing RPM, a second thawing step in which the indoor fan rotates in a second thawing RPM, and a third thawing step in which the indoor fan rotates in a third thawing RPM, and the second thawing RPM may be greater than the first thawing RPM and the third thawing RPM.

A time at which the indoor fan operates according to the thawing process may be longer than a time at which at least one of the indoor fan and the compressor operates according to the freezing process.

The at least one processor may be configured to execute the instructions to, based on a third relative humidity sensed through the at least one sensor being greater than or equal to a preset threshold humidity, control the indoor fan to operate in accordance with the second thawing step during a first thawing time, and based on the third relative humidity sensed through the at least one sensor while the indoor fan and the compressor are operating in the freezing process being less than the preset threshold humidity, control the indoor fan to operate in accordance with the second thawing step for a second time shorter than the first thawing time.

The at least one processor may be configured to execute the instructions to, based on a surface temperature of the indoor heat exchanger sensed through the at least one sensor while operating in accordance with the second thawing step being greater than or equal to a preset target evaporation temperature, terminate an operation according to the second thawing step.

According to an embodiment, a method of controlling an air conditioner comprising an indoor heat exchanger, an indoor fan, and a compressor includes identifying a freezing process to form ice-capsules on a surface of the indoor heat exchanger according to a sensed first relative humidity; controlling the indoor fan and the compressor to operate in the identified freezing process so that the ice-capsules are formed; identifying a thawing process to thaw the formed ice-capsules according to a sensed second relative humidity while the indoor fan and the compressor are operating in the identified freezing process; and controlling the indoor fan to operate in the identified thawing process.

The method may further include, based on a user command for cleaning the indoor heat exchanger being received, controlling the indoor fan and the compressor so that the indoor fan rotates in a first freezing revolution per number (RPM) and the compressor operates in a pre-freezing operation in which the compressor rotates by a first compressor RPM, and the identifying the freezing process may include identifying the freezing process in accordance with the sensed first relative humidity while the compressor is operating in the pre-freezing operation.

The controlling the indoor fan and the compressor may include, based on the sensed first relative humidity while the compressor is operating in the pre-freezing operation being greater than a first threshold humidity, controlling the indoor fan and the compressor so as not to perform an operation in accordance with the freezing process and the thawing process.

The controlling the indoor fan and the compressor may include, based on the sensed first relative humidity while the compressor is operating in the pre-freezing operation being less than or equal to the first threshold humidity and greater than or equal to a second threshold humidity less than the first threshold humidity, controlling the indoor fan and the compressor so that the indoor fan rotates in a second freezing RPM less than the first freezing RPM and the compressor rotates with a second compressor RPM greater than the first compressor RPM.

The controlling the indoor fan and the compressor may include based on the first relative humidity sensed through the at least one sensor while the compressor is operating in the pre-freezing operation being less than or equal to the first threshold humidity and less than the second threshold humidity, controlling the indoor fan and the compressor so as to operate in the first freezing operation and then operate in a second freezing operation in which the indoor fan rotates with the second freezing RPM and the compressor does not rotate or rotates in the first compressor RPM, and, after controlling the indoor fan and the compressor so as to operate in the second freezing operation, controlling the indoor fan and the compressor so as to operate in the first freezing operation.

The controlling the indoor fan and the compressor may include, based on an evaporation temperature sensed through the at least one sensor being greater than or equal to a first target evaporation temperature while the indoor fan and the compressor are operating in the first freezing operation, terminating an operation according to the first freezing operation.

The controlling the indoor fan and the compressor may include, based on a case of at least one of an indoor temperature sensed through the at least one sensor is less than a first threshold temperature while the compressor is operating in the pre-freezing operation, and an outdoor temperature sensed through the at least one sensor is less than a second threshold temperature while the compressor is operating in the pre-freezing operation, controlling the indoor fan and the compressor so as not to perform an operation according to the freezing process and the thawing process.

The thawing process may include a first thawing operation in which the indoor fan rotates in a first thawing RPM, a second thawing operation in which the indoor fan rotates in a second thawing RPM, and a third thawing operation in which the indoor fan rotates in a third thawing RPM, and the second thawing RPM may be greater than the first thawing RPM and the third thawing RPM.

A time at which the indoor fan operates according to the thawing process may be longer than a time at which at least one of the indoor fan and the compressor operates according to the freezing process.

The controlling the indoor fan may include, based on a third relative humidity sensed through the at least one sensor while the indoor fan and the compressor are operating in the freezing process being greater than or equal to a preset threshold humidity, controlling the indoor fan to operate in accordance with the second thawing operation during a first thawing time, and based on the third relative humidity sensed through the at least one sensor while the indoor fan and the compressor are operating in the freezing process being less than the preset threshold humidity, controlling the indoor fan to operate in accordance with the second thawing operation for a second time shorter than the first thawing time.

The controlling may include, based on a surface temperature of the indoor heat exchanger sensed through the at least one sensor while operating in accordance with the second thawing operation being greater than or equal to a preset target evaporation temperature, terminating an operation according to the second thawing operation.

BRIEF DESCRIPTION OF THE DRAWINGS

Additional aspects will be set forth in part in the description which follows and, in part, will be apparent from the description, or may be learned by practice of the presented embodiments.

FIG. 5 is a diagram illustrating a thawing process according to another embodiment of the disclosure;

FIGS. 6A and 6B are diagrams illustrating factors that may affect the determination of the freezing revolution per minute (RPM) according to the disclosure; and FIG. 7 is a flowchart illustrating a method of controlling an air conditioner according to an embodiment of the disclosure.

DETAILED DESCRIPTION

Figure 1:
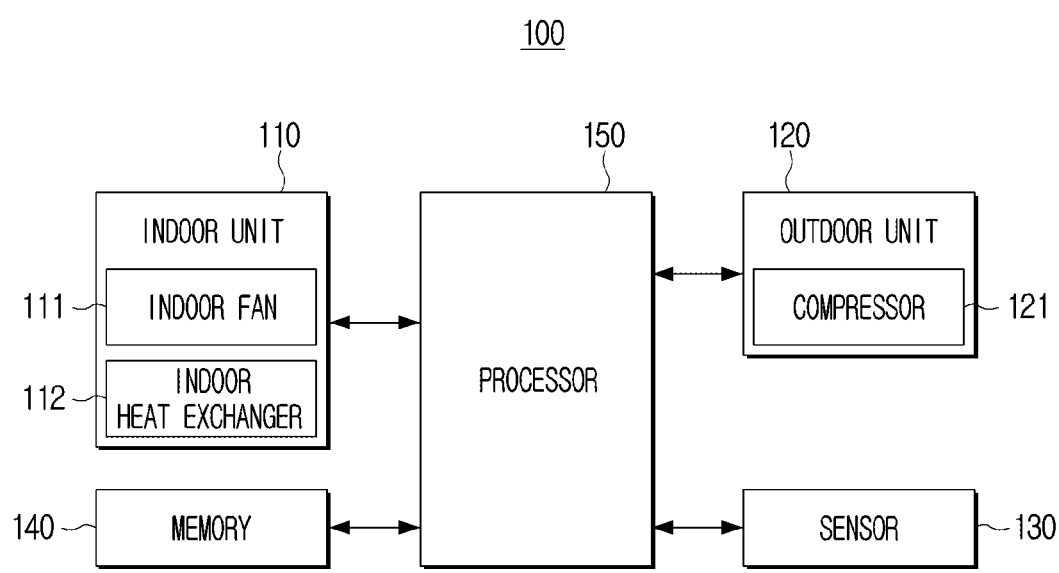
FIG. 1 schematically illustrates a configuration of an air conditioner according to an embodiment of the disclosure.

The embodiments may apply various transformations and have various embodiments, and specific embodiments are illustrated in the drawings and described in detail in the detailed description. However, it is to be understood that the disclosure is not limited to specific embodiments, but includes various modifications, equivalents, and/or alternatives according to embodiments of the disclosure. Throughout the accompanying drawings, similar components will be denoted by similar reference numerals.

In describing the disclosure, if it is determined that a detailed description of a related known function or configuration may unnecessarily obscure the gist of the disclosure, a detailed description thereof will be omitted.

In addition, the following embodiments may be modified in many different forms, and the scope of the technical spirit of the disclosure is not limited to the following examples. Rather, these embodiments are provided so that this disclosure will be thorough and complete, and will fully convey the technical spirit to those skilled in the art.

The terms used herein are to describe certain embodiments and are not intended to limit the scope of claims. A singular expression includes a plural expression unless otherwise specified.

The terms "have", "may have", "include", and "may include" used in the example embodiments of the disclosure indicate the presence of corresponding features (for example, elements such as numerical values, functions, operations, or parts), and do not preclude the presence of additional features.

In the description, the term "A or B", "at least one of A or/and B", "at least one of A and B", or "one or more of A or/and B" may include all possible combinations of the items that are enumerated together. For example, the term "at least one of A or/and B" includes (1) including at least one A, (2) including at least one B, or (3) including both at least one A and at least one B. Similarly, the term "at least one of A and B" includes (1) including at least one A, (2) including at least one B, or (3) including both at least one A and at least one B.

In addition, expressions "first", "second", or the like, used in the disclosure may indicate various components regardless of a sequence and/or importance of the components, may be used to distinguish one component from the other components, and do not limit the corresponding components.

When any component (for example, a first component) is (operatively or communicatively) coupled with/to or is connected to another component (for example, a second component), it is to be understood that any component may be directly coupled with/to another component or may be coupled with/to another component through the other component (for example, a third component).

On the other hand, when any component (for example, a first component) is "directly coupled with/to" or "directly connected to" to another component (for example, a second component), it is to be understood that the other component (for example, a third component) is not present between the directly coupled components.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

It is understood that various elements and regions in the figures are shown out of scale. Accordingly, the scope of the disclosure is not limited by the relative sizes or spacing drawn from the accompanying drawings.

Hereinafter, with reference to the attached drawings, embodiments will be described in detail so that those skilled in the art to which the disclosure belongs to can easily make and use the embodiments.

Various embodiments of the disclosure provide an air conditioner capable of effectively cleaning a heat exchanger included in an indoor unit of an air conditioner and a method for controlling thereof.

FIG. 1 schematically illustrates a configuration of an air conditioner 100 according to an embodiment of the disclosure.

The air conditioner 100 refers to a device for maintaining the indoor air to the most suitable state according to the use and purpose of the indoor air. The air conditioner 100 may adjust the indoor in a cooling state in the summer, adjust the indoor in a hot heating state in the winter, adjust indoor humidity, and adjust indoor air to a pleasant clean state. The air conditioner 100 may be implemented as a separate type air conditioner 100 including an outdoor unit 120 installed outdoors and an indoor unit 110 installed indoors. Although the disclosure is not applicable only to the air conditioner 100, the disclosure will now be described in detail with reference to various embodiments of the disclosure.

As illustrated in FIG. 1, the air conditioner 100 according to an embodiment of the disclosure may include an indoor unit 110, an outdoor unit 120, a sensor 130, a memory 140, and a processor 150. The indoor unit 110 may include an indoor fan 111 and an indoor heat exchanger 112, and the outdoor unit 120 may include a compressor 121. The indoor unit 110 and the outdoor unit 120 may include various configurations in addition to the configuration shown in FIG. 1, but will be described in detail with reference to FIGS. 2A and 2B.

The indoor fan 111 may suck air outside the indoor unit 110 into the indoor unit 110 by circulation. The indoor fan 111 may suck air outside the indoor unit 110 into the indoor unit 110 by the rotational force generated by the operation of the motor connected to the indoor fan 111.

The indoor heat exchanger 112 may exchange heat between the air outside the indoor unit 110 sucked in by the rotation of the indoor fan 111 and the refrigerant. The indoor heat exchanger 112 may be a heat exchanger of an F & Tube or an Al material.

The compressor 121 may compress a low-temperature low-pressure gas refrigerant, which is a hydraulic fluid, into a high-temperature and high-pressure gas refrigerant. Specifically, the compressor 121 may be an inverter compressor 121 of a rotation variable type.

The sensor 130 may sense various information of the air conditioner 100 and around the air conditioner 100. The air conditioner 100 according to the disclosure may include a plurality of sensors 130, and in particular, the plurality of sensors 130 may include an indoor temperature detection sensor 130, an outdoor temperature detection sensor 130, an indoor heat exchanger detection sensor 130, a relative humidity detection sensor 130, or the like.

At least one instruction regarding the air conditioner 100 may be stored in the memory 140. In addition, an operating system (O/S) for driving the air conditioner 100 may be stored in the memory 140. The memory 140 may store various software programs or applications to operate the air conditioner 100 according to the various embodiments of the disclosure, and the processor 150 may control the operation of the electronic device by executing various software modules that are stored in the memory 140. That is, the memory 140 may be accessed by the processor 150, and may perform reading, recording, modifying, deleting, updating, or the like, of data by the processor 150.

In the disclosure, the term memory 140 may be used in a sense that includes a non-volatile memory such as a flash memory and a volatile memory such as a random access memory (RAM).

The air conditioner 100 according to the disclosure may include a plurality of memories 140. Specifically, the indoor unit 110 and the outdoor unit 120 may be implemented to include an outdoor unit memory 140 and an outdoor unit memory 140, but the disclosure is not limited thereto.

According to the various embodiments of the disclosure, the memory 140 may store various data regarding the conditions of a freezing process and a thawing process in accordance with the disclosure. The memory 140 may store data for a predetermined condition for determining an operation process according to the disclosure, such as a first threshold humidity, a second threshold humidity, a third threshold humidity, a first target evaporation temperature, a second target evaporation temperature, or the like. Data for a condition for controlling the indoor fan 111 or the compressor 121 may be stored in the memory 140 according to an operation process according to the disclosure, such as the first freezing revolutions per minute (RPM), the second freezing RPM, the first compressor RPM, the second compressor RPM, the first thawing RPM, the second thawing RPM, the third thawing RPM, and the like.

In addition, various information required within a range for achieving the purpose of the disclosure may be stored in the memory 140, and the information stored in the memory 140 may be updated as they are received from an external device or input by a user.

Figure 2A:
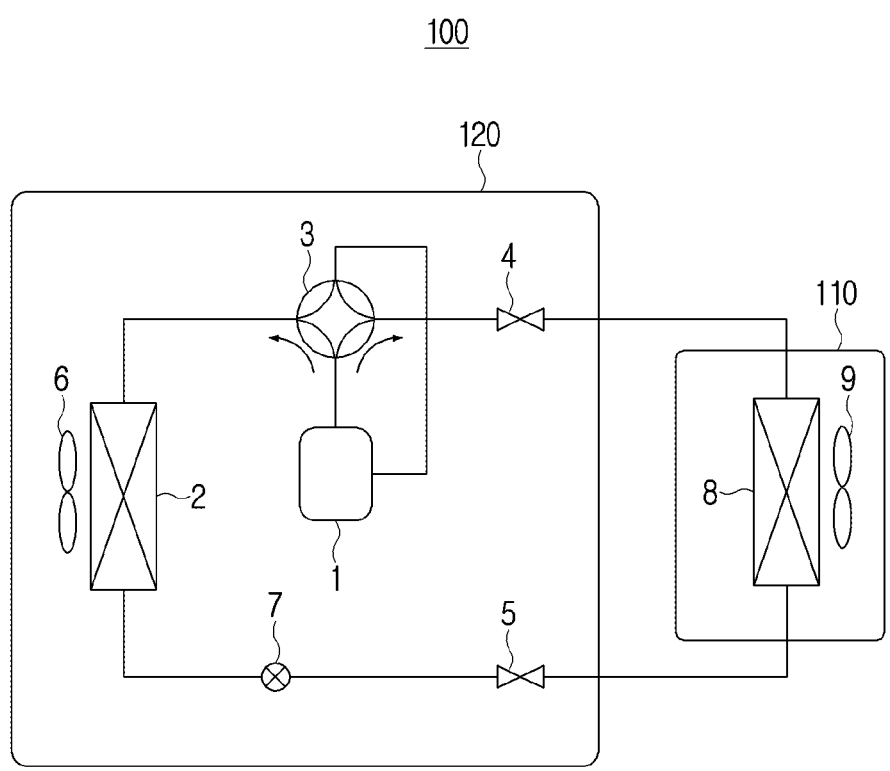
FIG. 2A is a detailed diagram of a configuration for implementing a refrigerant cycle of an air conditioner.
Figure 2B:
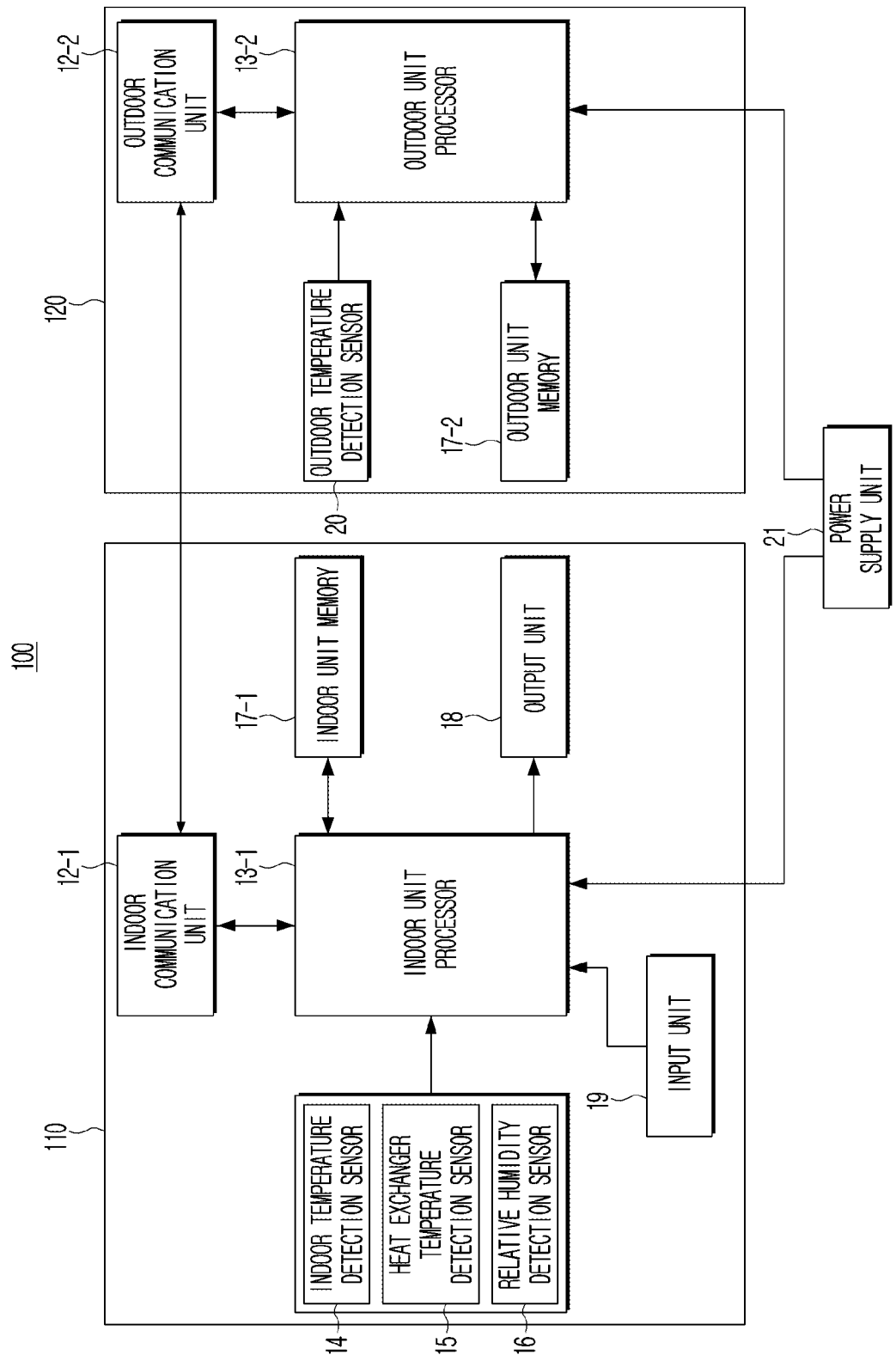
FIG. 2B is a detailed diagram of the operation of the air conditioner.

The processor 150 controls overall operations of the air conditioner 100. Specifically, the processor 150 is connected to a configuration of the air conditioner 100 including the indoor fan 111, indoor heat exchanger 112, compressor 121, sensor 130, memory 140, and various configurations of the air conditioner 100 as illustrated in FIGS. 2A and 2B, and controls overall operations of the air conditioner 100 by executing at least one instruction stored in the memory 140 as described above.

The processor 150 may be implemented in various ways. For example, the processor 150 may be implemented as at least one of an application specific integrated circuit (ASIC), an embedded processor, a microprocessor, a hardware control logic, a hardware finite state machine (FSM), a digital signal processor (DSP), or the like. Further, processor 150 may include at least one of a central processing unit (CPU), a graphic processing unit (GPU), a main processing unit (MPU), or the like.

The air conditioner 100 according to the disclosure may include a plurality of processors 150. The air conditioner 100 may include an indoor unit processor 150 included in the indoor unit 110 and an outdoor unit processor 150 included in the outdoor unit 120, and the indoor unit processor 150 and the outdoor unit processor 150 may be connected through a communication unit. However, in the description of the disclosure, the processor 150 or the at least one processor 150 is used as a terminology for collectively including an example in which the indoor unit 110 and the outdoor unit 120 include the indoor unit processor 150 and the outdoor processor 150, respectively, when the processor 150 is implemented in plural.

In various embodiments according to the disclosure, the processor 150 may identify an operation process corresponding to sensed information among various operation processes for cleaning the indoor heat exchanger based on information sensed through the sensor 130 as described above, and control the operation of the air conditioner 100 to operate in the identified operation process.

In describing the freezing process, the freezing process according to the disclosure refers to an operation process to form an ice-capsule on a surface of the indoor heat exchanger 112.

Specifically, when a user command for cleaning the indoor heat exchanger 112 is received, the processor 150 may control the indoor fan 111 and the compressor 121 to operate in a pre-freezing operation. The pre-freezing operation refers to an operation process in which the indoor fan 111 rotates by the first freezing RPM and the compressor 121 rotates with the first compressor RPM.

While operating in the pre-freezing operation, the processor 150 may control the indoor fan 111 and the compressor 121 so as not to perform an operation according to the freezing process and the thawing process when any one of the following cases occurs: (1) the indoor temperature sensed is less than the first threshold temperature, (2) the outdoor temperature is less than the second threshold temperature, (3) the relative humidity exceeds the first threshold humidity.

If the sensed indoor temperature is above a first threshold temperature and the outdoor temperature is greater than or equal to a preset second threshold temperature while operating in a pre-freezing operation, the processor 150 may identify (or determine) a freezing process according to the disclosure, depending on whether the relative humidity is less than a preset second threshold humidity which is less than the first threshold humidity.

Herein below, a case where the sensed indoor temperature is above a first threshold temperature and an outdoor temperature is greater than or equal to a preset second threshold temperature and the relative humidity is less than or equal to a predetermined first threshold humidity during the operation of the pre-freezing operation is described.

If the sensed relative humidity is greater than or equal to a preset second threshold humidity while operating in the pre-freezing operation, the processor 150 may control the indoor fan 111 and the compressor 121 to operate in a first freezing operation after operating in a pre-freezing operation. Here, the first freezing operation refers to an operation process in which the indoor fan 111 is rotated with a second freezing RPM which is smaller than the first freezing RPM of the pre-freezing operation, and the compressor 121 rotates with a second compressor RPM greater than the first compressor RPM of the pre-freezing operation.

If the sensed relative humidity is less than a preset second threshold humidity during the operation of the pre-freezing operation, the processor 150 may control the indoor fan 111 and the compressor 121 to operate in a first freezing operation after operating in the pre-freezing operation, in the same manner when the sensed relative humidity is greater than or equal to a predetermined second threshold humidity.

However, unlike the case where the sensed relative humidity is greater than or equal to a preset second threshold humidity while operating in the pre-freezing operation, if the relative humidity sensed while operating in the pre-freezing operation is less than the preset second threshold humidity, the processor 150 may control the indoor fan 111 and the compressor 121 to operate in a first freezing operation, and then additionally operate in the second freezing operation, and then the first freezing operation again. The second freezing operation refers to a freezing process in which the indoor fan 111 rotates with the same freezing RPM as the second freezing RPM of the first freezing operation, and the compressor 121 may not rotate or rotate with the first compressor RPM of the pre-freezing operation.

Thawing process according to the disclosure refers to an operation process for thawing an ice-capsule formed on a surface of an indoor heat exchanger 112 as a result of operation according to a freezing process. The thawing process may include a first thawing operation, a second thawing operation, and a third thawing operation, which are sequentially performed.

The first thawing operation refers to the step of rotating the indoor fan 111 by the first thawing RPM. The first thawing RPM and the operating time according to the first thawing operation may be set to effectively thaw the ice-capsule formed on the surface of the indoor heat exchanger 112 to form condensate water. In particular, the first thawing RPM may be set to be smaller than the second thawing RPM in the second thawing operation in order to minimize the occurrence of a fog phenomenon and an expansion noise that may appear at the time when the operation in accordance in the thawing process is initiated after the operation according to the freezing process is completed.

The second thawing operation refers to the step of rotating the indoor fan 111 with a second thawing RPM which is an RPM greater than the first thawing RPM. According to the second thawing operation, the second thawing RPM and the operating time may be set to more effectively thaw the ice-capsule formed on the surface of the indoor heat exchanger 112, and to effectively dry the condensate water generated on the outer and inner surfaces of the indoor unit 110.

The third thawing operation refers to the step of rotating the indoor fan 111 with a third thawing RPM which is an RPM smaller than the second thawing RPM. The third thawing RPM and the operation time according to the third thawing operation may be set to effectively dry the condensate water formed in the fine porous holes when the fine porous holes are applied to the remaining condensate water after the second thawing operation has been performed.

The processor 150 may identify (or determine) the thawing process in accordance with the disclosure, in accordance with the sensed relative humidity while the freezing process in accordance with the disclosure is performed. Specifically, if the relative humidity sensed through the at least one sensor 130 is greater than or equal to a preset third threshold humidity while the freezing process is being performed, the processor 150 may control the indoor fan 111 to operate in a first thawing process. In contrast, if the relative humidity sensed through the at least one sensor 130 is less than a preset third threshold humidity while the freezing process is being performed, the processor 150 may control the indoor fan 111 to operate in a second thawing process.

The first thawing process and the second thawing process may each include a first thawing operation, a second thawing operation, and a third thawing operation as described above. The first thawing operation and the third thawing operation of the first thawing process are the same as the first thawing operation and the third thawing operation of the second thawing process, but the second thawing operation of the first thawing process and the second thawing operation of the second thawing process may be different from each other.

Specifically, the operation time according to the second thawing operation of the first thawing process may be set to be longer than the operation time in accordance with the second thawing operation of the second thawing process. Based on the relative humidity sensed through the at least one sensor 130 being greater than or equal to a preset third threshold humidity while the freezing process is being performed, the processor 150 may control the indoor fan 111 to operate in accordance with the second thawing operation during a first thawing time, and based on the relative humidity sensed through the at least one sensor 130 being less than a preset third threshold humidity while the freezing process is being performed, the processor 150 may control the indoor fan 111 to operate in accordance with the second thawing operation for a second time shorter than the first thawing time.

The operation time in accordance with the overall thawing process may be set to be longer than the operating time according to the entire freezing process. Specifically, the time at which the indoor fan 111 is operated in accordance with the thawing process may be set to be longer than the time at which at least one of the indoor fan 111 and the compressor 121 operates according to the freezing process.

According to various embodiments of the disclosure as described above, the heat exchanger included in the indoor unit of the air conditioner may be frozen to separate contaminants attached to the surface of the heat exchanger, and the condensate water that is formed according to thawing of the ice-capsule is discharged to the outside of the indoor unit, thereby effectively removing contaminants attached to the surface of the heat exchanger.

The control process of the processor 150 related to the operation according to the freezing process and the following process according to the disclosure has been briefly described, and a specific condition of each operation process and specific meaning will be described in greater detail with reference to the flowchart of FIGS. 3 to 5. The configuration of the air conditioner 100 according to the disclosure will be described in detail with reference to FIGS. 2A and 2B.

FIG. 2A is a detailed diagram of a configuration for implementing a refrigerant cycle of the air conditioner 100, and FIG. 2B is a detailed diagram of the operation of the air conditioner 100.

FIG. 1 is a block diagram illustrating a configuration of the air conditioner 100 according to an embodiment of the disclosure, and FIGS. 2A and 2B illustrate the air conditioner 100 according to the disclosure in greater detail. In the description of FIGS. 2A and 2B, a detailed description of the configuration of FIG. 1 will be omitted.

As shown in FIG. 2A, the air conditioner 100 may include the indoor unit and the outdoor unit, and the indoor unit may include the indoor heat exchanger and the indoor fan. The outdoor unit may include the compressor 1, the outdoor heat exchanger 2, a four-way valve 3, a low pressure service valve, a high pressure service valve, an outdoor fan, an electronic expansion valve, and an indoor heat exchanger.

Specifically, the outdoor unit may include the compressor 1 for compressing a low-temperature low-pressure object refrigerant, which is a hydraulic oil, to a high-temperature and high-pressure gas refrigerant, an outdoor heat exchanger 2 for performing heat exchange with an external heat source, and a four-way valve 3 for switching the flow of the refrigerant for cooling and heating. The outdoor unit 120 may include a low-pressure service valve 4 and a high-pressure service valve 5 for coupling the connecting pipe between the indoor unit 110 and the outdoor unit 120. The outdoor fan 6 may be disposed around the outdoor heat exchanger 2 so that heat exchange between the refrigerant circulating in the outdoor heat exchanger 2 and the external air may be effectively performed. The electronic expansion valve (EEV) 7 serves as an expansion device for flow control.

The indoor unit 110 may include an indoor fan 9 for sucking air outside the indoor unit 110 into the indoor unit 110 by rotation, and an indoor heat exchanger 8 for performing heat exchange between the air outside the indoor unit 110 sucked in by the rotation of the indoor fan 9 and the refrigerant.

As shown in FIG. 2B, the indoor unit 110 may include an indoor communication unit 12-1, an indoor unit processor 13-1, an indoor temperature detection sensor 14, a heat exchanger temperature detection sensor 15, a relative humidity detection sensor 16, an outdoor unit memory 17-1, an output unit 18, and an input unit 19.

More specifically, the indoor temperature detection sensor 14 may sense the temperature of the space in which the indoor unit 110 is disposed, and the heat exchanger temperature detection sensor 15 may sense the temperature of the indoor heat exchange temperature and the inlet/outlet of the indoor heat exchanger 8, and the relative humidity detection sensor 16 may sense the relative humidity around the indoor unit 110.

The outdoor unit memory 17-1 may store various information for controlling the operation of the indoor unit 110 and various information for controlling the operation of the indoor unit 110, and in particular, the temperature and humidity obtained through the sensors as described above. The indoor unit processor 13-1 may control the operation of the indoor unit 110, and in particular, may control the operation of the indoor unit 110 based on at least one instruction and various information stored in the memory. The indoor unit processor 13-1 may include an indoor fan control module for controlling the operation and the RPM of the indoor fan 9.

The output unit 18 may output a variety of functions that the air conditioner 100 may perform, and the output unit 18 may include at least one of the display, a speaker and an indicators.

In particular, according to various embodiments of the disclosure, the output unit 18 may output a notification indicating that an operation for cleaning an indoor heat exchanger according to the disclosure has been initiated, a notification indicating that a specific freezing process or a thawing process according to the disclosure is in progress, a notification that the freezing process or the thawing process is terminated, a notification that indicates that an error has occurred in a freezing process or a thawing process according to the disclosure, and the like.

The input unit 19 may receive a user command for controlling the air conditioner 100, and the input unit 19 may include at least one of a microphone, a camera, and a remote control receiver. The input unit 19 may be implemented as a touch screen included in a display.

In various embodiments of the disclosure, the input unit 19 may receive a user command to clean the indoor heat exchanger. In addition, the input unit 19 may receive a command to enable a user to directly control a specific operation of a freezing process or a thawing process according to the disclosure. For example, the input unit 19 may receive a user command for temporarily stopping the freezing process while the freezing process is performed.

As shown in FIG. 2B, the outdoor unit 120 may include an outdoor communication unit 12-2, an outdoor unit processor 13-2, an outdoor temperature detection sensor 20, and an outdoor unit memory 17-2.

The outdoor temperature detection sensor 20 may sense the temperature of the space in which the outdoor unit 120 is disposed. The outdoor unit processor 13-2 may control the operation of the outdoor unit 120 based on at least one command and various information stored in the outdoor unit memory 17-2. Specifically, the outdoor unit processor 13-2 may include a compressor driving module for controlling the operation and the RPM of the compressor 1, an outdoor fan control module for controlling the operation and RPM of the outdoor fan, a four-way valve control module for controlling the flow of the refrigerant for cooling and heating, and an expansion valve control module for controlling the flow rate according to a predetermined condition.

The indoor communication unit 12-1 and the outdoor communication unit 12-2 may be disposed in the indoor unit 110 and the outdoor unit 120, respectively, in order to perform communication between the indoor unit 110 and the outdoor unit 120. The power supply for each configuration included in the indoor unit 110 and the outdoor unit 120 may be supplied through a power supply unit 21. Various embodiments related to freezing process and thawing process according to the disclosure will be described in further detail with reference to FIGS. 3 to 5.

Figure 3:
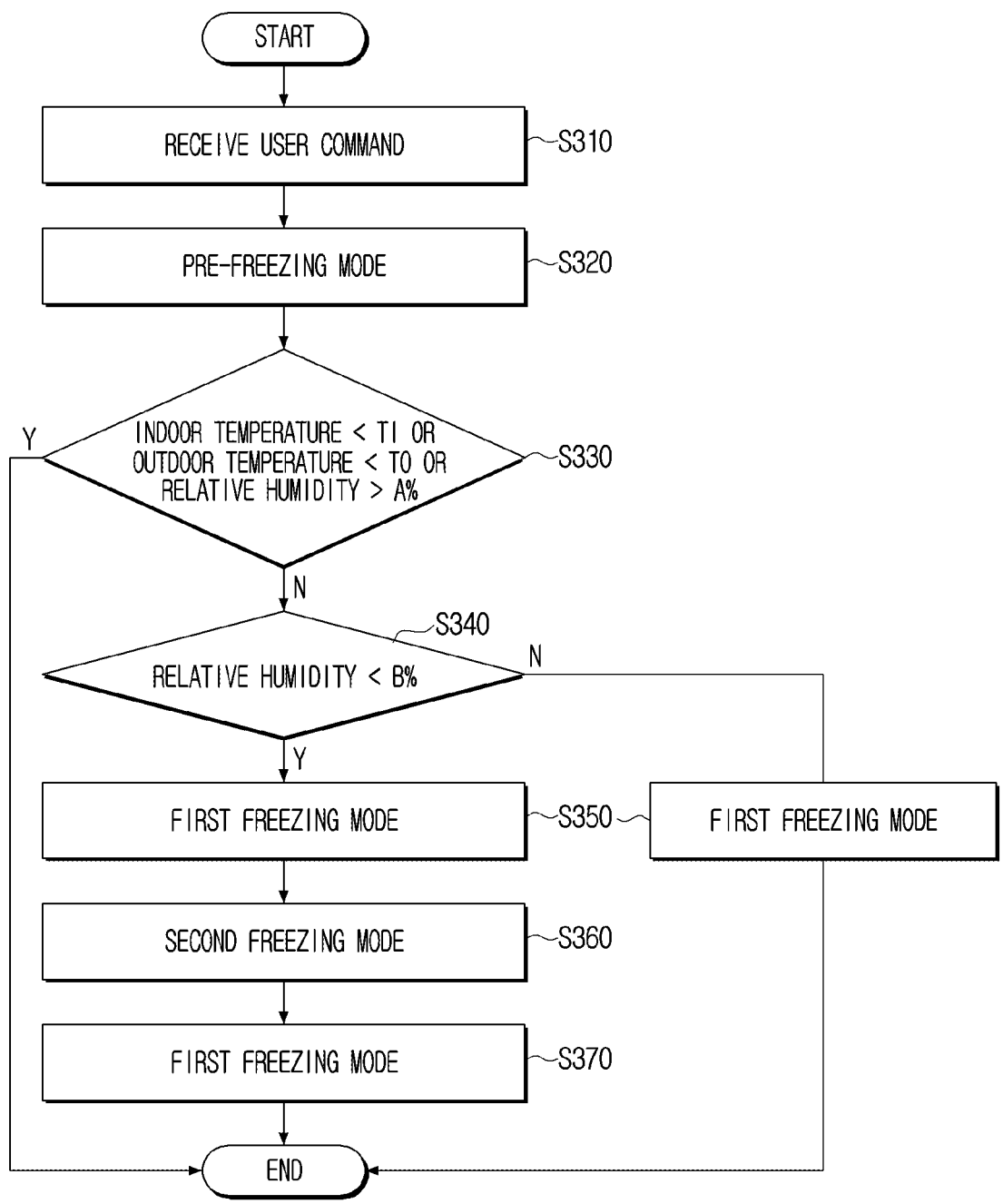
FIG. 3 is a diagram illustrating a freezing process in accordance with an embodiment of the disclosure.

FIG. 3 is a diagram illustrating a freezing process in accordance with an embodiment of the disclosure;

As described above, the freezing process according to the disclosure refers to an operation process for forming an ice-capsule on the surface of an indoor heat exchanger.

As shown in FIG. 3, when a user command is received in operation S310, the air conditioner 100 may perform an operation according to the pre-freezing operation in operation S320. Specifically, when a user command for cleaning the indoor heat exchanger is received, the air conditioner 100 may control the indoor fan and compressor to operate in a pre-freezing operation.

Here, the pre-freezing operation refers to an operation process in which the indoor fan rotates by the first freezing RPM and the compressor rotates with the first compressor RPM. According to the pre-freezing operation, the first freezing RPM, the first compressor RPM, and the operation time may be set so as to identify that the air conditioner 100 may be normally operated, and the dew is formed on the surface of the indoor heat exchanger so that the freezing may be effectively performed. In particular, it is preferable that the first freezing RPM has a higher accuracy of air condition and amount detection as the flow rate of the refrigerant decreases, so that the purpose of the pre-freezing operation may be smoothly achieved.

For example, the first freezing RPM may be set within a range of 15 to 20 Hz, the first compression RPM may be set within a range of 5 to 15 Hz, and the operating time according to the pre-freezing operation may be set within a range of 2 to 3 minutes. However, it is to be understood that the numerical ranges as described above are exemplary only, and within the scope to achieve the purpose of the disclosure, the above example may be set to a different numerical range.

While operating in the pre-freezing operation, the air conditioner 100 may sense the temperature of the indoor space in which the indoor unit is disposed (hereinafter, indoor temperature), temperature of an outdoor space in which the outdoor unit is disposed (hereinafter, outdoor temperature), and the relative humidity of the indoor space in which the indoor unit is disposed. The air conditioner 100 may determine whether an operation according to the freezing process of the disclosure is to be performed based on the sensed indoor temperature, the outdoor temperature, and the relative humidity while the air conditioner 100 operates in a pre-freezing operation in operation S330.

In a case of at least one of (1) the indoor temperature detected during operation in the pre-freezing operation is less than the first threshold temperature (Ti), (2) the outdoor temperature is less than the second threshold temperature (To), and (3) the relative humidity exceeds preset first threshold humidity (A %) in operation S330-Y, the air conditioner 100 may control the indoor fan and the compressor so as not to perform the operation according to the freezing process and the thawing process. In other words, in a case of at least one of (1) the indoor temperature is less than the first threshold temperature Ti, (2) the outdoor temperature is less than the second threshold temperature To, and (3) the relative humidity is greater than the first threshold humidity (A %), the air conditioner 100 may not perform the operation according to the freezing process according to the disclosure, and may not perform the operation according to the thawing process either.

Here, a case of at least one of (1) the indoor temperature detected during operation in the pre-freezing operation is less than the first threshold temperature (Ti), (2) the outdoor temperature is less than the second threshold temperature (To), and (3) the relative humidity exceeds preset first threshold humidity (A %) includes: (a) a case where the indoor temperature detected during operation in the pre-freezing operation is less than the first threshold temperature (Ti), (b) a case where the outdoor temperature is less than the second threshold temperature (To), (c) a case where the relative humidity exceeds preset first threshold humidity (A %), (d) a case where the indoor temperature detected during operation in the pre-freezing operation is less than the first threshold temperature (Ti) and the outdoor temperature is less than the second threshold temperature (To), (e) a case where the indoor temperature detected during operation in the pre-freezing operation is less than the first threshold temperature (Ti) and the relative humidity exceeds preset first threshold humidity (A %), (f) a case where the outdoor temperature is less than the second threshold temperature (To) and the relative humidity exceeds preset first threshold humidity (A %), and (g) a case where the indoor temperature detected during operation in the pre-freezing operation is less than the first threshold temperature (Ti), the outdoor temperature is less than the second threshold temperature (To), and the relative humidity exceeds preset first threshold humidity (A %).

When the room temperature is less than the first threshold temperature (Ti) and if the outdoor temperature is less than the second threshold temperature (To), the cooling cycle itself of the air conditioning unit 100 may not be formed, so the operation according to the freezing process and thawing process according to the disclosure may not be performed. If the relative humidity is greater than the preset first threshold humidity (A %), the operation according to freezing process and thawing process according to this disclosure may not be performed because the problem of reliability for the surface and interior of the indoor unit may occur when performing freezing process.

For example, the first threshold temperature Ti may be set to 5 degrees Celsius. Specifically, in conditions where the room temperature is less than or equal to 0 degrees Celsius, ice-capsules may occur on the indoor heat exchanger surface in a short period of time, quickly reaching freezing process release conditions for compressor protection and thus, cleaning effect may be less. However, when considering the aspects of safety and the point that the first threshold temperature Ti may correspond to abnormal cooling cycle conditions when the first threshold temperature Ti is set to 0 degrees Celsius, the first threshold temperature Ti may be set to 5 degrees Celsius.

The second threshold temperature To may be set to 0 degrees Celsius. Considering that there is a high possibility that liquid refrigerant will flow into the compressor during cooling operation under the condition that the outdoor temperature is 0 degrees Celsius or less, and the long-term durability of the compressor (low lubrication performance of oil) if liquid compression occurs according to the inflow of liquid refrigerant, the second threshold temperature To may be set to 0 degrees Celsius.

The first threshold humidity (A %) may be set to 80 to 90%, the second threshold humidity (B %) may be set to 50 to 60%. Specifically, relative humidity is important for the increase in surface ice-capsule implantation amount on the indoor heat exchange surface. The higher the relative humidity, the greater the amount of condensate water generated on the indoor heat exchanger surface during cooling operation, and the longer the time to reach the freezing conditions, which is advantageous for increasing the implantation amount of ice-capsules. However, when the relative humidity is too high, such as when the relative humidity is 80 to 90% or more, it is necessary to avoid freezing operation because dew condensation occurs on the exterior and interior of the indoor unit. If the relative humidity is too low as in the case where the relative humidity is 50 to 60% or less, even if the freezing operation is performed, the implantation amount is small, and the cleaning effect may be deteriorated. After all, the ranges of the first threshold humidity (A %) and the second threshold humidity (B %) according to the disclosure are preferably set in consideration of the factors described above.

The numeral range of the first threshold temperature (Ti), the second threshold temperature (To), the first threshold humidity (A %) and the second threshold humidity (B %) have been described for example, but this is only an example, and the numerical range as described above may vary depending on the actual structure and performance of the indoor fan and compressor applied in the implementation of the air conditioner 100 according to this disclosure.

During operation in the pre-freezing operation, if the detected indoor temperature is greater than or equal to the first threshold temperature (Ti), the outdoor temperature is greater than or equal to a preset second threshold temperature (To), and the relative humidity is less than or equal to a preset first threshold humidity (A %) in operation S330-N, the air conditioner 100 may identify (or determine) the freezing process according to the disclosure, depending on whether the relative humidity is less than a preset second threshold humidity (B %) smaller than the first threshold humidity in operation S340.

Hereinafter, a case where the sensed indoor temperature is greater than or equal to the first threshold temperature Ti, the outdoor temperature is greater than or equal to a predetermined second threshold temperature To, and the relative humidity is less than or equal to a predetermined first threshold humidity (A %) during the operation of the pre-freezing operation will be described.

If the relative humidity detected while operating in the pre-freezing operation is greater than or equal to the preset second threshold humidity (B %) in operation S340-N, the air conditioner 100 may control the indoor fan and the compressor to operate in the pre-freezing operation and then in the first freezing operation in operation S350, and then the freezing process according to the disclosure may be terminated as indicated by the branch S340-N in FIG. 3.

The first freezing operation refers to an operation process in which the indoor fan rotates with a second freezing RPM smaller than the first freezing RPM of the pre-freezing operation, and the compressor rotates with a second compressor RPM larger than the first compressor RPM of the pre-freezing operation. However, the embodiment is not limited thereto, and the second freezing RPM, the second compressor RPM and the operating time according to the first freezing operation may be substantially set so that ice-capsule may be effectively formed on the surface of the indoor heat exchanger.

If the second freezing RPM is too high, the surface temperature of the indoor heat exchanger does not fall below 0 degrees Celsius, so the ice-capsule does not implant, and if the RPM is too low, the freezing process release condition is quickly reached and implantation amount may rather be reduced. The second freezing RPM is preferably set in consideration of such factors. The second compressor RPM is preferably set to a higher RPM than the first compressor RPM in that the first freezing operation is for substantially freezing the indoor heat exchanger. However, the specific numerical range may be determined differently depending on the displacement of the compressor applied, or the like. The operating time according to the first freezing operation may be set, for example, to 12 to 15 minutes. The implantation amount of ice-capsule is proportional to the operating time according to the first freezing operation, but it is preferable to set the operating time according to the first freezing operation, taking into account that it may fall outside the pressure guarantee range for each operating condition of the compressor applied when driving for a long time.

The operating time according to the first freezing operation may be preset as described above, and also may be dynamically determined according to the evaporation temperature detected during operation in the first freezing operation. Specifically, if the evaporation temperature detected during operation in the first freezing operation is higher than or equal to the preset first target evaporation temperature, it is possible to terminate the operation according to the first freezing operation. In other words, according to one embodiment of the disclosure, the operating time according to the first freezing operation may be determined flexibly according to the detected evaporation temperature.

Here, since the amount of ice-capsule formed on the indoor heat exchanger surface is determined according to the first target evaporation temperature, the first target evaporation temperature is a very important design factor. The first target evaporation temperature should be set to a temperature low enough for sufficient ice-capsule to be formed on the indoor heat exchanger surface, while if set to an excessively low temperature, the liquid refrigerant may be introduced into the compressor inlet in a large amount, so that a problem of reliability of compressor due to liquid compression may occur. In other words, the first target evaporation temperature according to the disclosure needs to be set in consideration of both the cleaning effect and reliability. For example, the first target evaporation temperature may be minus 20 degrees Celsius, but may be set differently depending on the pressure guarantee range for each applied operating condition of the compressor.

If the relative humidity detected while operating in the pre-freezing operation is less than the preset second threshold humidity (B %) in operation S340-Y, the air conditioner 100 may control the indoor fan and the compressor to operate in the pre-freezing operation and then the first freezing operation in the same manner as in the case where the detected relative humidity is greater than or equal to the preset second threshold humidity (B %) in operation S350.

Unlike the example where the relative humidity detected during the pre-freezing operation is greater than or equal to the second threshold humidity (B %) in operation S340-N, if the relative humidity detected during operation in the pre-freezing operation is less than the second threshold humidity (B %) in operation S340-Y, the air conditioner 100 may control the indoor fan and the compressor to operate in the first freezing operation, and then in the second freezing operation in operation S360, and may control the indoor fan and compressor to operate in the first freezing operation again in operation S370.

The second freezing operation is a freezing process in which the indoor fan rotates at the same freezing RPM as the second freezing RPM of the first freezing operation, and the compressor does not rotate or rotates at the first compressor RPM of the pre-freezing operation. In the second freezing operation, the air conditioner 100 may control the indoor fan and the compressor to operate by changing the compressor RPM to be smaller than the second compressor RPM of the first freezing operation while maintaining the freezing RPM equal to the second freezing RPM of the first freezing operation. Here, keeping the freezing RPM the same as the second freezing RPM of the first freezing operation considers that it is difficult to effectively increase the amount of the implantation even if the first freezing operation is additionally performed afterward, as all the formed condensate water is evaporated when increasing the freezing RPM.

Specifically, if the relative humidity detected during operation in a pre-freezing operation is more than the preset second threshold humidity (B %), with only the operation according to the pre-freezing operation and the first freezing operation, an ice-capsule may be formed on the surface of the indoor heat exchanger, but in the case of relatively low humidity conditions, it may be desirable to perform additional operations according to the freezing process in addition to the validity of freezing process. If the relative humidity detected during operation in a pre-freezing operation is less than the preset second threshold humidity (B %), the air conditioner 100 may perform an operation according to the second freezing operation and the first freezing operation after the operation according to the pre-freezing operation and the first freezing operation is performed, so that freezing may occur effectively. By performing the operation according to the first freezing operation and performing the operation according to the second freezing operation, and then performing the operation according to the first freezing operation again in the state where the condensate water remains on the indoor heat exchanger surface, the effects of increase in the amount of the implantation, and the cleaning effect of the indoor heat exchanger may be obtained.

Here, after performing the operation according to the pre-freezing operation, the operation according to the first freezing operation is not performed for a long time period. Instead, after performing the operation according to the first freezing operation, the operation according to the second freezing operation is performed, and then the operation according to the first freezing operation performed again, to prevent a problem such as overload that may occur when the compressor rotates at a high compressor RPM for a long time.

Among the operations according to the freezing process as shown in FIG. 3, it is not necessary that the operation according to the first freezing operation in operation S350, the operation according to the second freezing operation in operation S360, and the operation according to the first freezing operation in operation S370, be performed on the same operation conditions, and the operations may be determined differently in a range of, for example, an operation time range according to the first freezing RPM, the second compressor RPM and the second freezing operation.

Hereinafter, a thawing process according to the disclosure will be described with reference to FIG. 4 on the assumption that the operation according to the freezing process as described above is performed.

Figure 4:
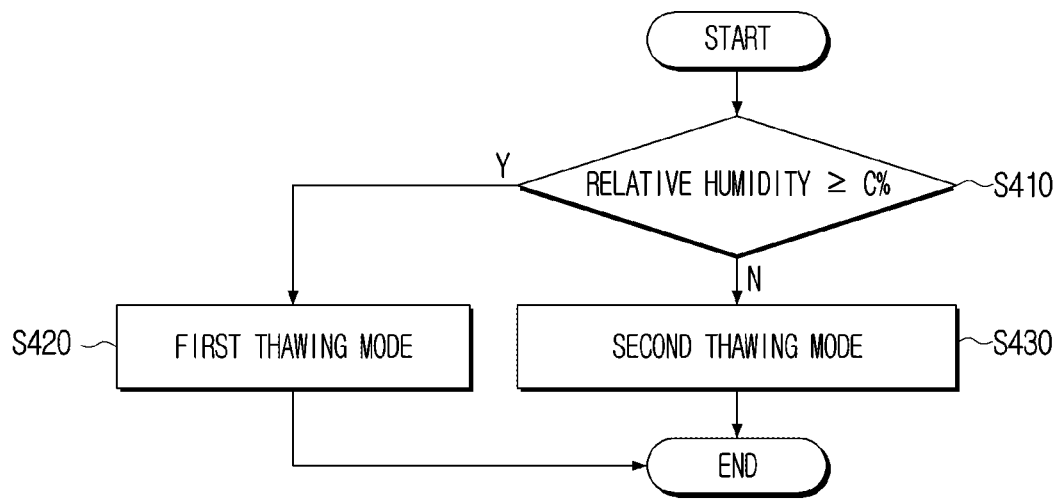
FIG. 4 is a diagram illustrating a thawing process according to an embodiment of the disclosure.

FIG. 4 is a diagram illustrating a thawing process according to an embodiment of the disclosure.

The thawing process according to the disclosure refers to an operation process for thawing the ice-capsule formed on the surface of the indoor heat exchanger as a result of performing the operation according to freezing process. In a broader sense, thawing process refers to an operation process to thaw the ice-capsule formed on the surface of the indoor heat exchanger, discharge the condensate water formed accordingly outside the indoor unit, and dry the condensate water remaining in the indoor unit.

Specifically, in thawing process, the compressor stops and the indoor fan is operated, thereby increasing the surface temperature of the indoor heat exchanger. While the operation according to freezing process is carried out, the temperature of cold air discharged drops to the level of 0 degrees Celsius, and accordingly the indoor unit exterior and interior surface temperature are formed below the dew point temperature so that the condensate water by condensation occurs by a large amount on the surface. Therefore, it is necessary to dry the air conditioner 100 through the operation according to the thawing process.

The thawing process may include the first thawing operation, the second thawing operation, and the third thawing operation sequentially performed.

The first thawing operation refers to the stage in which the indoor fan rotates in the first thawing RPM. The first thawing RPM and operation time according to the first thawing operation may be set to effectively thaw the ice-capsule formed on the indoor heat exchanger surface to form condensate water. In particular, the first thawing RPM may be set to be less than the second thawing RPM in the second thawing operation to minimize the occurrence of haze phenomenon and expansion sound that may appear at the time the operation according to the thawing process is initiated after the operation according to freezing process is terminated. According to one embodiment, the first thawing RPM may be set to the same as the first freezing RPM as described above.

The second thawing operation refers to the step in which the indoor fan rotates into the second thawing RPM, which is an RPM greater than the first thawing RPM. The second thawing RPM and operation time according to the second thawing operation may be set to more effectively thaw the ice-capsule formed on the indoor heat exchanger surface, and effectively dry the condensate water generated on the indoor unit exterior and the inner surface. The second thawing RPM according to the second thawing operation may be set to the maximum RPM of the indoor fan, for effective thawing and drying.

The third thawing operation refers to the step in which the indoor fan rotates in the third thawing RPM, which is an RPM smaller than the second thawing RPM. The third thawing RPM and operating time according to the third thawing operation may be set to effectively dry the condensate water formed in the fine porous hole when a fine porous hole is applied to the condensate water remaining after the second thawing operation is performed, especially when the fine porous hole is applied to the indoor unit front panel.

As shown in FIG. 4, according to the relative humidity detected while freezing process according to the disclosure is performed, it is necessary to identify (or determine) the thawing process according to the disclosure in operation S410. If the relative humidity detected through at least one sensor while freezing process is performed is higher or equal to the third threshold humidity (C %) in operation S410-Y, the air conditioner 100 may control the indoor fan to operate in the first thawing process in operation S420. If the relative humidity detected through at least one sensor is less than the third threshold humidity (C %) while freezing process is performed in operation S410-N, the air conditioner 100 may control the indoor fan to operate in a second thawing process in operation S430.

The first thawing process and the second thawing process may include the first thawing operation, the second thawing operation, and the third thawing operation, respectively, as described above. The first thawing operation and the third thawing operation of the first thawing process are the same as the first thawing operation and the third thawing operation of the second thawing process, but the second thawing operation of the first thawing process and the second thawing operation of the second thawing process may be different from each other.

Specifically, the operating time according to the second thawing operation of the first thawing process may be set to be longer than the operating time according to the second thawing operation of the second thawing process. In other words, if the relative humidity detected through at least one sensor while the freezing process is being performed is equal to or higher than the preset third threshold humidity (C %) in operation S410-Y, the indoor fan may be controlled to operate according to the second thawing operation during the first thawing time, and if the relative humidity sensed through at least one sensor during freezing process is less than the preset third threshold humidity (C %) in operation S410-N, the indoor fan may be controlled to operate according to the second thawing operation during the second thawing time which is shorter than the first thawing time. This is to prevent a side effect such as unnecessarily increasing the operation time according to the thawing process until the relative humidity is relatively low and generating odors accordingly from occurring.

If the third threshold humidity is set too low, it may cause the problem of unnecessarily increasing the operating time according to the thawing process, on the contrary, if the third threshold humidity is set too high, condensate water generated on the indoor unit exterior and the inner surface may occur when not dried effectively. Therefore, the third threshold humidity is preferably set in consideration of these factors. For example, the third threshold humidity may be set to 75%, but is not limited thereto.

The operating time according to the total thawing process may be set longer than the operating time according to the total freezing process. Specifically, the time at which the indoor fan operates according to the thawing process may be set to be longer than the time that at least one of the indoor fans and compressor operates according to freezing process. This is to effectively dry the inside and outside of the indoor unit, including the indoor heat exchanger.

By fixing the operating time according to the first thawing operation and the operating time according to the third thawing operation to a specific value, and varying the operating time according to the second thawing operation, the operating time according to the total thawing process may be set for a longer time than the operating time according to the total freezing process. For example, the operating time according to the first thawing operation and the operating time according to the third thawing operation may all be set to a fixed time of three minutes, and the operating time according to the second thawing operation may be set to up to 50 minutes in a variable manner depending on the relative humidity.

FIG. 5 is a diagram illustrating a thawing process according to another embodiment of the disclosure.

The operation time according to the thawing process of the disclosure, specifically, the operation time according to each thawing step may be preset as described above, but according to another embodiment of the disclosure, the operation time according to each thawing step may also be determined dynamically depending on the surface temperature of the indoor heat exchanger.

As in the case of the embodiment described above with reference to FIG. 4, in the thawing process according to the embodiment described with reference to FIG. 5, the first thawing operation in operation S510 in which the indoor fan rotates at the first thawing RPM, a second thawing operation in operation S530 in which the indoor fan rotates at a second thawing RPM that is greater than the first thawing RPM, and a third thawing RPM in operation S540 in which the indoor fan rotates at a third thawing RPM lower than the second thawing RPM may be included.

In the embodiment as described above with reference to FIG. 4, the operation time according to the first thawing operation, the second thawing operation and the third thawing operation may be set according to each step, the operating time according to the total thawing process may be set longer than the operating time according to the total freezing process, as described above. However, according to another embodiment of the disclosure, the operating time according to the second thawing operation may be determined according to the surface temperature of the indoor heat exchanger in operation S530.

If the surface temperature of the indoor heat exchanger detected through at least one sensor during operation according to the second thawing operation is less than the preset second target evaporation temperature (TEVAP) in operation S530-N, the air conditioner 100 may maintain the operation according to the second thawing operation.

If the surface temperature of the indoor heat exchanger detected through at least one sensor while operating according to the second thawing operation is equal to or greater than the preset second target evaporation temperature in operation S530-Y, the air conditioner 100 may end the operation according to the second thawing operation and may perform the operation according to the third thawing operation. In this case, the operation time according to the third thawing operation may be set so that the operation time according to the entire thawing process including the time until the operation according to the second thawing operation is terminated is longer than the operation time according to the entire freezing process.

The second target evaporation temperature corresponds to a measure that may determine whether the condensate water has been dried according to the thawing process. For example, the second target evaporation temperature may be set to 5 degrees Celsius.

As described above with reference to FIG. 5, according to an embodiment of the disclosure, it is possible to determine an operation time in accordance with a thawing process according to the surface temperature of the indoor heat exchanger.

Figure 6B:
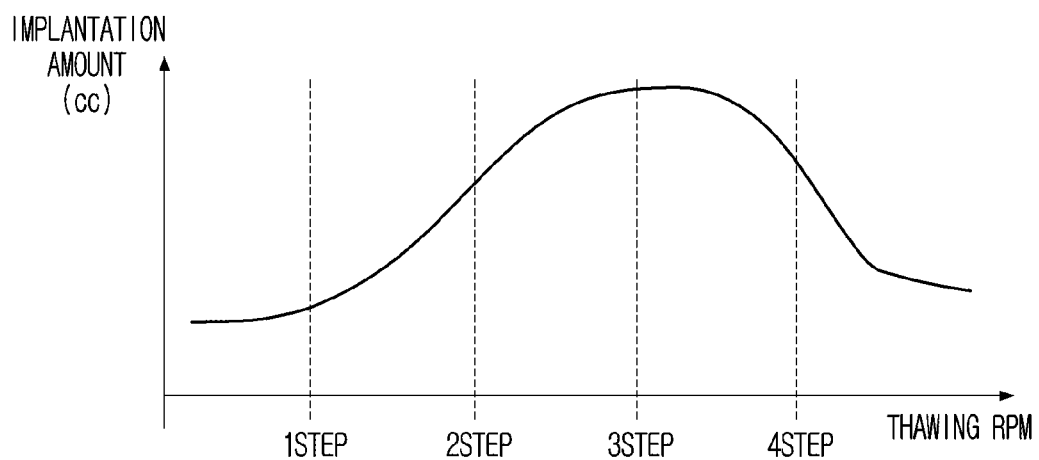

FIGS. 6A and 6B are diagrams illustrating factors that may affect the determination of the freezing revolution per minute (RPM) according to the disclosure.

FIG. 6A is a table showing the implantation amount of the ice-capsule according to the increase or decrease of the freezing RPM, the amount of discharge of the condensate water, the freezing time, the haze amount, and the heat shrinkage expansion sound.

When the freezing RPM is set to high, there may be an advantage that the amount of implantation on the ice-capsule formed on the surface of the indoor heat exchanger increases, and accordingly, the amount of condensation discharged to the outside of the indoor unit also increases. In addition, if the number of freezing RPM is set high, the sound of thermal contraction and expansion of a spurt that may be caused by a sudden temperature change may be reduced.

However, if the freezing RPM is set high, the time required to lower the freezing point to the optimal freezing point increases, which increases the freezing time, and the amount of mist generated in the indoor heat exchanger by the ventilation of the indoor fan during the freezing section also increases. If the number of freezing RPM is set excessively high, there may be a problem that freezing itself is not made.

In contrast, if the freezing RPM is set low, the time required to lower the freezing point to the optimal freezing point is reduced, which shortens the freezing time, and the amount of mist generated in the indoor heat exchanger by the ventilation of the indoor fan during the freezing section may be reduced. However, if the freezing RPM is set low, there is a problem in that the amount of implantation and the discharge amount of condensate water are reduced, so that the cleaning effect is lowered, and the noise characteristics are also deteriorated due to the rapid temperature drop.

FIG. 6B is a graph illustrating an implantation amount of ice-capsules according to increase or decrease of the freezing RPM in greater detail.

As shown in FIG. 6B, generally, as the freezing RPM increases, the time to reach the freezing point may increase, and the implantation amount of ice-capsule may also increase, but when the freezing RPM increases above a certain freezing RPM (3 STEP), the implantation amount of ice-capsule may also decrease.

The range of the freezing RPM as described earlier with reference to FIG. 3 is set to take into account the correlation with various factors as shown in FIG. 6A, in particular the second freezing RPM of the first freezing operation is set based on the tendency as shown in FIG. 6B.

FIG. 7 is a flowchart illustrating a method of controlling the air conditioner 100 according to an embodiment of the disclosure.

Since the configuration of the air conditioner 100 according to the disclosure, the definition of various terms related to freezing process and thawing process according to the disclosure has been described above, the following duplicate descriptions are omitted. Various embodiments as described above in relation to the air conditioner 100 may be similarly applied to the control method of the air conditioner 100 according to the disclosure below.

As shown in FIG. 7, the air conditioner 100 according to an embodiment of the disclosure identifies a freezing process according to the sensed relative humidity in operation S710, controls the indoor fan and the compressor so as to operate in the identified freezing process in operation S720.

Specifically, when a user command for cleaning an indoor heat exchanger is received, the air conditioner 100 may control the indoor fan and the compressor to operate in a pre-freezing operation.

If the indoor temperature detected while operating in the pre-freezing operation is equal to or greater than the first threshold temperature, the outdoor temperature is equal to or greater than the second threshold temperature, and the relative humidity is greater than the first threshold humidity, the air conditioner 100 may identify (or determine) the freezing process according to the disclosure, depending on whether the relative humidity is less than a preset second threshold humidity that is smaller than the first threshold humidity.

If the relative humidity detected during operation in the pre-freezing operation is less than the preset second threshold humidity, the air conditioner 100 may control the indoor fan and compressor to operate in the first freezing operation after operating in a pre-freezing operation, in the same manner as the detected relative humidity is more than or equal to the second threshold humidity.

However, if the relative humidity detected during operation in the pre-freezing operation is less than the preset second threshold humidity, the air conditioner 100 may control the indoor fan and compressor to additionally operate in the second freezing operation, after operating in the first freezing operation, and further control the indoor fan and compressor to operate again in the first freezing operation.

If the relative humidity detected during operation in the pre-freezing operation is greater than or equal to the preset second threshold humidity, the air conditioner 100 may control the indoor fan and the compressor to operate in the pre-freezing operation and then operate in the first freezing operation.

When the operation according to the freezing process as described above is performed, it is possible to separate a contaminant attached to the surface of the indoor heat exchanger by forming the ice-capsules on the surface of the indoor heat exchanger.

The air conditioner 100 may identify the thawing process according to the relative humidity detected while freezing process is performed in operation S730, and may control the indoor fan to operate in the identified thawing process in operation S740.

The thawing process may include the first thawing operation, the second thawing operation, and the third thawing operation sequentially performed.

The first thawing operation refers to the stage in which the indoor fan rotates into the first thawing RPM. The first thawing RPM and operation time according to the first thawing operation may be set to effectively thaw the ice-capsule formed on the indoor heat exchanger surface to form condensate water. In particular, the first thawing RPM may be set to be less than the second thawing RPM in the second thawing operation to minimize the occurrence of haze phenomenon and expansion sound that may appear at the time the operation according to the thawing process is begun after the operation according to freezing process is terminated.

Meanwhile, the second thawing operation refers to a step in which the indoor fan rotates at a second thawing RPM that is greater than the first thawing RPM. The second thawing RPM and operating time according to the second thawing operation may be set to more effectively thaw the ice-capsule formed on the surface of the indoor heat exchanger and to effectively dry the condensate water generated on the exterior and interior surfaces of the indoor unit.

The third thawing operation refers to a step in which the indoor fan rotates at a third thawing RPM that is smaller than the second thawing RPM. The third thawing RPM and operating time according to the third thawing operation may effectively dry the condensate water remaining after the second thawing operation is performed, especially, when the micro-porous hole is applied to the front panel of the indoor unit, the condensate water formed in the micro-porous hole may be set to be effectively dried.

The air conditioner 100 may identify (or determine) the thawing process according to the disclosure, according to the relative humidity detected while freezing process according to the disclosure is performed. Specifically, if the relative humidity detected through at least one while freezing process is performed is at least the third threshold humidity, the air conditioner 100 may control the indoor fan to operate in the first thawing process. If the relative humidity detected while freezing process is less than the third threshold humidity, the air conditioner 100 may control the indoor fan to operate in the second thawing process.

Here, the first thawing process and the second thawing process may include the first thawing operation, the second thawing operation and the third thawing operation, respectively, as described above. The first thawing operation and the third thawing operation of the first thawing process may be the same as the first and third thawing operations of the second thawing process, but the second thawing operation of the first thawing process and the second thawing operation of the second thawing process may be different from each other.

The operating time according to the second thawing operation of the first thawing process may be set to be longer than the operating time according to the second thawing operation of the second thawing process. In other words, if the relative humidity detected while freezing process is performed is more than the third threshold humidity, the air conditioner 100 may control the indoor fan to operate according to the second thawing operation during the first thawing time, and if the relative humidity detected while freezing process is performed is less than the third threshold humidity, the air conditioner may control the indoor fan to operate according to the second thawing operation for a second time shorter than the first thawing time.

When an operation according to the above-described operation is performed, the ice-capsule formed on the surface of the indoor heat exchanger may be thawed, and the formed condensate water may be discharged to the outside of the indoor unit.

According to various embodiments of the disclosure as described above, by freezing the heat exchanger contained in the indoor unit of the air conditioner 100 to form an ice-capsule on the surface to separate the contaminants attached to the heat exchanger surface, and then discharge the condensate water formed as thawing the ice-capsule formed, it is possible to effectively remove the contaminants attached to the heat exchanger surface.

The air conditioner according to the disclosure may lower the surface of the indoor heat exchanger to the freezing point through the freezing process to artificially form an ice-capsule on the surface of the indoor heat exchanger to separate contaminants attached to the surface of the indoor heat exchanger, and may discharge the contaminants separated through the thawing step to the outside of the indoor unit together with the condensate water, so the embodiment may have a remarkably excellent cleaning effect compared to the prior art.

According to the disclosure, the operation process is configured as a freeze-thawing step rather than the three steps of blowing-freezing-drying as in the prior art, so the overall operating time may be shortened, and since the operation is performed according to the first freezing operation in which actual freezing is performed after operation according to the pre-freezing operation, the amount of implantation occurring on the surface of the indoor heat exchanger may be increased, and the freezing time may be shortened.

The thawing process consists of three steps in total, and it is possible to minimize the haze and injection expansion sounds that may be generated by performing the operation according to the thawing process after the operation according to the freezing process. A problem that may occur since the surface temperature outside and inside the indoor unit is formed below the dew point temperature, and the condensation is completely removed and condensate water may remain due to dew condensation may be solved.

In describing the disclosure, based on a specific threshold such as the first threshold temperature, the second threshold temperature, the first threshold humidity, the second threshold humidity, the third threshold humidity, the first target evaporation temperature and the second target evaporation temperature, the operation of the disclosure is described by dividing the examples into an example where the specific threshold is 'greater than or equal to/less' or an example where the specific threshold is 'excess/less than or equal to' but this is only about an embodiment of this disclosure. For example, the operation according to the first thawing process and the operation according to the second thawing process are respectively performed by dividing the case where the relative humidity is higher than or equal to the third threshold humidity and the case where the relative humidity is less than the third threshold humidity. However, according to another embodiment, the cases may be divided into a case in which the relative humidity exceeds a preset third threshold humidity and a case in which the relative humidity is less than or equal to a preset third threshold humidity so as to perform the operation according to the first thawing process and the second thawing process, respectively.

Each of the elements (e.g., a module or a program) according to various embodiments may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration.

Operations performed by a module, a program, or another element, in accordance with various embodiments, may be performed sequentially, in a parallel, repetitively, or in a heuristically manner, or at least some operations may be performed in a different order, omitted or a different operation may be added.

The term "unit" or "module" used in the disclosure includes units consisting of hardware, software, or firmware, and is used interchangeably with terms such as, for example, logic, logic blocks, parts, or circuits. A "unit" or "module" may be an integrally constructed component or a minimum unit or part thereof that performs one or more functions. For example, the module may be configured as an application-specific integrated circuit (ASIC).

The various embodiments described above may be implemented as software including instructions stored in a machine-readable storage media which is readable by a machine (e.g., a computer). The device may include the air conditioner 100 according to the disclosed embodiments, as a device which calls the stored instructions from the storage media and which is operable according to the called instructions.

When the instructions are executed by a processor 130, the processor may directory perform functions corresponding to the instructions using other components or the functions may be performed under a control of the processor. The instructions may include code generated or executed by a compiler or an interpreter.

A machine-readable storage medium may be provided in the form of a non-transitory storage medium. Herein, the term "non-transitory" only denotes that a storage medium does not include a signal (e.g., electromagnetic wave) but is tangible, and does not distinguish the case in which a data is semi-permanently stored in a storage medium from the case in which a data is temporarily stored in a storage medium. For example, "non-transitory storage medium" may include a buffer in which data is temporarily stored.

According to an embodiment, the method according to the above-described embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™ and App Store™) or distributed online. In the case of online distribution, at least a portion of the computer program product (e.g., a downloadable app) may be at least temporarily stored or temporarily generated in a server of the manufacturer, a server of the application store, or a machine-readable storage medium such as memory of a relay server.

While example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. An air conditioner comprising:
an indoor unit comprising a heat exchanger and an indoor fan;
an outdoor unit comprising a compressor;
a first sensor configured to sense a relative humidity of a space in which the indoor unit is installed; and
a processor configured to clean the heat exchanger by controlling the indoor fan and the compressor to perform a freezing process in which ice-capsules are formed on a surface of the heat exchanger, and, after the freezing process is performed, perform a thawing process in which the ice-capsules formed on the surface of the heat exchanger are thawed and the heat exchanger is dried,
wherein the processor is configured to control the indoor fan and the compressor to operate in a pre-freezing operation to form dew on the surface of the heat exchanger based on a user command to clean the heat exchanger being received,
wherein based on the relative humidity sensed by the first sensor being less than a threshold humidity, the freezing process is performed, and includes:
performing a first freezing operation in which the compressor is controlled to operate at a preset first revolution per minute (RPM),
after the first freezing operation is performed, performing a second freezing operation in which the compressor is controlled to operate at a preset second RPM that is lower than the preset first RPM, and
after performing the second freezing operation, repeating the first freezing operation again.

2. The air conditioner of claim 1, wherein the processor is configured to, based on receiving the user command to clean the heat exchanger, perform the pre-freezing operation to form dew on the surface of the heat exchanger prior to performing the first freezing operation.

3. The air conditioner of claim 1, wherein the processor is configured to control the indoor fan to rotate while the first freezing operation, the second freezing operation, and the first freezing operation are sequentially performed in the freezing process.

4. The air conditioner of claim 1, wherein the processor is configured to, based on the relative humidity sensed through the first sensor being greater than the threshold humidity, control the indoor fan and the compressor to perform the first freezing operation, but not the second freezing operation, and thereafter to perform the thawing process.

5. The air conditioner of claim 1, wherein the preset second RPM is 0.

6. The air conditioner of claim 1, further comprising:
a display,
wherein the processor is configured to, based on determining that the freezing process is being performed, control the display to display at least one notification related to progress of the freezing process.

7. The air conditioner of claim 6, wherein the processor is configured to:
based on determining that the freezing process is being performed, control the display to display a notification indicating that the freezing process is being performed while the freezing process is being performed, and
based on the freezing process being terminated, control the display to display a notification indicating that the freezing process is terminated.

8. The air conditioner of claim 1, further comprising:
a second sensor to sense indoor temperature in the space in which the indoor unit is installed; and
a third sensor to sense outdoor temperature in a space in which the outdoor unit is installed,
wherein the processor is configured to:
based on the indoor temperature sensed by the second sensor and the outdoor temperature sensed by the third sensor being within a preset first temperature range and a preset second temperature range, respectively, determine to perform the freezing process, and
based on the indoor temperature being outside the preset first temperature range or the outdoor temperature being outside the preset second temperature range, determine not to perform the freezing process.

9. The air conditioner of claim 1, further comprising:
a second sensor to sense indoor temperature in the space in which the indoor unit is installed; and
a third sensor to sense outdoor temperature in a space in which the outdoor unit is installed,
wherein the processor is configured to:
based on the indoor temperature being less than a preset first threshold temperature and the outdoor temperature being less than a preset second threshold temperature, determine to perform the freezing process, and
based on falling to at least one of the indoor temperature being less than the preset first threshold temperature or the outdoor temperature being less than the preset second threshold temperature, determine not to perform the freezing process.

10. The air conditioner of claim 9, further comprising:
a display, and
wherein the processor is further configured to, based on determining not to perform the freezing process, control the display to display a notification indicating that the freezing process is not performed.

11. An air conditioner comprising:
an indoor unit comprising a heat exchanger and a indoor fan;
an outdoor unit comprising a compressor;
a first sensor configured to sense relative humidity of a space in which the indoor unit is installed; and
a processor configured to clean the heat exchanger by controlling the indoor fan and the compressor to perform a freezing process in which ice-capsules are formed on a surface of the heat exchanger, and, after the freezing process is performed, perform a thawing process in which the ice-capsules formed on the surface of the heat exchanger are thawed and the heat exchanger is dried,
wherein the processor is configured to control the indoor fan and the compressor to operate in a pre-freezing operation to form dew on the surface of the heat exchanger based on a user command to clean the heat exchanger being received, wherein based on the relative humidity sensed by the first sensor being less than a threshold humidity, the freezing process is performed, and includes:

performing a first freezing operation in which the compressor is controlled to operate at a preset revolution per minute (RPM), after the first freezing operation is performed, performing a second freezing operation in which the compressor does not rotate, and after performing the second freezing operation, repeating the first freezing operation again.

12. The air conditioner of claim 11, further comprising:
a display, and
wherein the processor is configured to, based on determining that the freezing process is being performed, control the display to display at least one notification related to progress of the freezing process.

13. The air conditioner of claim 12, wherein the processor is configured to:
based on determining that the freezing process is being performed, control the display to display a notification indicating that the freezing process is being performed while the freezing process is being performed, and
based on the freezing process being terminated, control the display to display a notification indicating that the freezing process is terminated.

14. The air conditioner of claim 13, wherein the processor is configured to, based on determining that the freezing process is not performed, control the display to display a notification indicating that the freezing process is not performed.

15. The air conditioner of claim 11, wherein the processor is configured to, based on receiving the user command to clean the heat exchanger, perform a pre-freezing operation to form dew on the surface of the heat exchanger prior to performing the first freezing operation.

16. The air conditioner of claim 11, wherein the processor is configured to control the indoor fan to rotate while the first freezing operation, the second freezing operation, and the first freezing operation are sequentially performed in the freezing process.

17. The air conditioner of claim 11, wherein the processor is configured to, based on the relative humidity sensed through the first sensor being greater than the threshold humidity, control the indoor fan and the compressor to perform the first freezing operation, but not the second freezing operation, and thereafter perform the thawing process.

18. The air conditioner of claim 11, further comprising:
a second sensor to sense indoor temperature in the space in which the indoor unit is installed; and
a third sensor to sense outdoor temperature in a space in which the outdoor unit is installed,
wherein the processor is configured to:
based on the indoor temperature sensed by the second sensor and the outdoor temperature sensed by the third sensor being within a preset first temperature range and a preset second temperature range, respectively, determine to perform the freezing process, and
based on the indoor temperature being outside the preset first temperature range or the outdoor temperature being outside the preset second temperature range, determine not to perform the freezing process.

19. The air conditioner of claim 11, further comprising:
a second sensor to sense indoor temperature in the space in which the indoor unit is installed; and
a third sensor to sense outdoor temperature in a space in which the outdoor unit is installed, and
the processor is configured to:
based on the indoor temperature sensed by the second sensor being greater than a preset first threshold temperature and the outdoor temperature sensed by the third sensor being greater than a preset first second threshold temperature, determine to perform the freezing process, and
based on the indoor temperature sensed by the second sensor being less than the preset first threshold temperature or the outdoor temperature sensed by the third sensor being less than the preset second threshold temperature, determine not to perform the freezing process.

20. A method of controlling an air conditioner that includes an indoor unit including a heat exchanger and a indoor fan, an outdoor unit including a compressor, and a sensor configured to sense relative humidity of a space in which the indoor unit is installed, the method comprising:
cleaning the heat exchanger by controlling the indoor fan and the compressor to perform a freezing process in which ice-capsules are formed on a surface of the heat exchanger, and, after the freezing process is performed, perform a thawing process in which the ice-capsules formed on the surface of the heat exchanger are thawed and the heat exchanger is dried,
wherein the method further comprises: controlling the indoor fan and the compressor to operate in a pre-freezing operation to form dew on the surface of the heat exchanger based on a user command to clean the heat exchanger being received,
wherein based on the relative humidity sensed by the sensor being less than a threshold humidity, the freezing process is performed and includes:
performing a first freezing operation in which the compressor is controlled to operate at a preset first revolution per minute (RPM),
after the first freezing operation is performed, performing a second freezing operation in which the compressor is controlled to operate at a preset second RPM that is lower than the preset first RPM, and
after performing the second freezing operation, repeating the first freezing operation again.

21. The method of claim 20, further comprising:
based on determining that the freezing process is performed, displaying at least one notification related to progress of the freezing process.

22. The method of claim 21, wherein the displaying at least one notification related to progress of the freezing process comprises:
based on determining that the freezing process is being performed, displaying a notification indicating that the freezing process is being performed while the freezing process is being performed; and
based on the freezing process being terminated, displaying a notification indicating that the freezing process is terminated.

23. The method of claim 22, wherein the displaying at least one notification related to progress of the freezing process further comprises:
based on determining not to perform the freezing process, displaying a notification indicating that the freezing process is not performed.

24. The method of claim 20, further comprising:
based on receiving the user command to clean the heat exchanger, performing a pre-freezing operation to form dew on the surface of the heat exchanger prior to performing the first freezing operation.

25. The method of claim 20, further comprising:
controlling the indoor fan to rotate while the first freezing operation, the second freezing operation, and the first freezing operation are sequentially performed in the freezing process.

* * * * *

UNITED STATES PATENT AND TRADEMARK OFFICE
CERTIFICATE OF CORRECTION

PATENT NO. : 12,259,149 B2
APPLICATION NO. : 17/848591
DATED : March 25, 2025
INVENTOR(S) : Kilsoo Son et al.

Page 1 of 1

It is certified that error appears in the above-identified patent and that said Letters Patent is hereby corrected as shown below:

In the Claims

Column 25, Line 40:
In Claim 1, delete "performed," and insert -- performed --.

Column 27, Line 6:
In Claim 11, delete "performed," and insert -- performed --.

Column 28, Line 20:
In Claim 19, after "preset" delete "first".

Signed and Sealed this
First Day of July, 2025

Coke Morgan Stewart
*Acting Director of the United States Patent and Trademark Office*